US012606477B2

(12) United States Patent
De Angelis et al.

(10) Patent No.: US 12,606,477 B2
(45) Date of Patent: Apr. 21, 2026

(54) ASSEMBLY FOR SUPPORTING AN ELECTRICAL FLANGE IN A GLASS MANUFACTURING APPARATUS

(71) Applicant: CORNING INCORPORATED, Corning, NY (US)

(72) Inventors: Gilbert De Angelis, Lindley, NY (US); Raymond Eugene Fraley, Waverly, NY (US); Benjamin Pelham Schrock, Wilmington, NC (US); Tytus Lee Zimmerman, Columbia Cross Roads, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/667,234

(22) Filed: May 17, 2024

(65) Prior Publication Data

US 2024/0300841 A1 Sep. 12, 2024

Related U.S. Application Data

(62) Division of application No. 17/277,980, filed as application No. PCT/US2019/052075 on Sep. 20, 2019, now Pat. No. 12,017,945.

(60) Provisional application No. 62/737,498, filed on Sep. 27, 2018, provisional application No. 62/846,900, filed on May 13, 2019.

(51) Int. Cl.
  *C03B 7/07* (2006.01)
  *C03B 5/167* (2006.01)
  *C03B 17/06* (2006.01)

(52) U.S. Cl.
  CPC ................ *C03B 7/07* (2013.01); *C03B 5/167* (2013.01); *C03B 17/064* (2013.01)

(58) Field of Classification Search
  None
  See application file for complete search history.

(56) References Cited

U.S. PATENT DOCUMENTS

| | | | |
|---|---|---|---|
| 4,287,380 A | 9/1981 | Blumenfeld et al. | |
| 4,824,462 A | 4/1989 | Schwenninger | |
| 5,776,221 A | 7/1998 | Dembicki et al. | |

(Continued)

FOREIGN PATENT DOCUMENTS

| | | | | |
|---|---|---|---|---|
| CN | 107922232 A | 4/2018 | | |
| JP | 2013216535 A | * 10/2013 | ............. | C03B 18/18 |

(Continued)

OTHER PUBLICATIONS

JP-2013216535-A English Abstract by Clarivate Analytics retrieved Jul. 31, 2025. (Year: 2025).*

(Continued)

*Primary Examiner* — Lisa L Herring
(74) *Attorney, Agent, or Firm* — Kevin M. Able; F. Brock Riggs

(57) ABSTRACT

Apparatus for conveying molten glass includes an electrical flange attached to a metallic vessel and an electrical flange support apparatus coupled to an electrode portion of the electrical flange and configured to prevent distortion of the metallic vessel and misalignment between the metallic vessel and an adjacent metallic vessel. A bracing assembly is also disclosed.

11 Claims, 9 Drawing Sheets

(56) References Cited

U.S. PATENT DOCUMENTS

| | | | |
|---|---|---|---|
| 6,286,337 | B1 | 9/2001 | Palmquist |
| 2009/0107183 | A1 | 4/2009 | Purvis et al. |
| 2012/0125051 | A1 | 5/2012 | Bergman et al. |
| 2014/0013806 | A1 | 1/2014 | De et al. |
| 2018/0297882 | A1* | 10/2018 | De Angelis .............. C03B 5/43 |
| 2020/0156981 | A1 | 5/2020 | De et al. |
| 2020/0299171 | A1 | 9/2020 | Tenyama et al. |

FOREIGN PATENT DOCUMENTS

| | | | | |
|---|---|---|---|---|
| JP | 2014-198656 | A | 10/2014 | |
| JP | 5769574 | B2 | 8/2015 | |
| JP | 6247958 | B2 | 12/2017 | |
| JP | 2018-095519 | A | 6/2018 | |
| KR | 20190003381 | A * | 1/2019 | .............. C03B 7/02 |
| WO | 2014/116549 | A1 | 7/2014 | |
| WO | 2018/110217 | A1 | 6/2018 | |
| WO | 2018/170392 | A2 | 9/2018 | |
| WO | 2020/068569 | A1 | 4/2020 | |
| WO | 2020/068750 | A1 | 4/2020 | |

OTHER PUBLICATIONS

KR-20190003381-A Clarivate Analytics Machine Translation retrieved Jul. 31, 2025. (Year: 2025).*

Chinese Patent Application No. 202310105788.1, Office Action dated Mar. 28, 2025, 5 pages (English Translation only), Chinese Patent Office.

Chinese Patent Application No. 201980076408.8, Office Action, dated Aug. 24, 2022, 5 pages, of English Translation; Chinese Patent Office.

International Search Report and Written Opinion of the International Searching Authority;PCT/US2019/052075; Mailed on Dec. 13, 2019, 9 pages; European Patent Office.

Japanese Patent Application No. 2021-517477, Office Action, dated Aug. 9, 2023, 6 pages (3 pages of English Translation and 3 pages of Original Copy); Japanese Patent Office.

* cited by examiner

ASSEMBLY FOR SUPPORTING AN ELECTRICAL FLANGE IN A GLASS MANUFACTURING APPARATUS

CROSS-REFERENCE TO RELATED APPLICATIONS

This application is a divisional of U.S. patent application Ser. No. 17/277,980 filed on Mar. 19, 2021, which is a national stage application under 35 U.S.C. § 371 of International Application No. PCT/US2019/052075 filed on Sep. 20, 2019, which claims the benefit of priority of U.S. Provisional Application Ser. No. 62/737,498 filed on Sep. 27, 2018, and U.S. Provisional Application Ser. No. 62/846,900 filed on May 13, 2019, the contents of which are relied upon and incorporated herein by reference in their entirety.

BACKGROUND

Field

The present disclosure relates to an apparatus for forming a glass article, and more particularly an assembly for supporting an electrical flange configured to deliver an electrical current to a metallic vessel.

Technical Background

It is known to heat metallic vessels, particularly metallic vessels used in the containment and delivery of molten glass, for example delivery of molten glass to a glass article forming apparatus, by delivering an electric current to the metallic vessel through two or more electrical flanges attached to and in electrical communication with the metallic vessel. The electrical current heats the metallic vessel by Joule heating, which in turn heats the molten glass therein. Such Joule heating can, for example, be used to control a viscosity of the molten glass in preparation for forming.

The walls of the metallic vessel can be thin relative to the thickness of the electrical flanges, and hence the greater weight of the electrical flanges should be adequately supported to prevent damage to the metallic vessel. Moreover, because the metallic vessel can expand and contract with temperature changes, for example during a heat-up or cooldown cycle, the electrical flange support should be capable of accommodating movement of the flanges, which are rigidly attached to the metallic vessel and move therewith.

SUMMARY

In accordance with the present disclosure, a glass manufacturing apparatus is described comprising a metallic vessel configured to convey molten glass and an enclosure disposed about the metallic vessel. An electrical flange can be attached to the metallic vessel, the electrical flange comprising an electrode portion extending away from the metallic vessel and through the enclosure. An electrical flange support apparatus may be coupled to the electrode portion of the electrical flange.

In some embodiments, the electrical flange support apparatus can comprise a support bracket assembly mounted to the enclosure and coupled to the electrode portion. For example, in some embodiments, the support bracket assembly may comprise opposing attachment plates and a clamping member disposed between and engaged with the opposing attachment plates, the clamping member coupled to the electrode portion. The support bracket assembly can be configured to be movable when the glass manufacturing apparatus is heated, such as during startup of the glass manufacturing apparatus, allowing movement of the bracket assembly and reducing stress on the electrical flange during startup. At the completion of startup, such as when the glass manufacturing apparatus has reached a steady-state operating temperature, the support bracket assembly can be secured, such as with fasteners, to secure the electrical flange.

The clamping member may comprise tabs extending from ends thereof, the tabs engaged with openings defined by the attachment plates. The clamping member may be further coupled to the attachment plates by fasteners extending through the clamping member and the attachment plates such that the clamping member can be attached to each attachment plate at separate, spaced-apart locations. The clamping member helps support the electrical flange, and prevents dropping of the flange via the tabs, which limited downward movement of the clamping member.

The electrical flange support apparatus may further comprise an adjustment assembly for adjusting a position of the support bracket assembly comprising an adjustment base mounted to the enclosure and coupled to the support bracket assembly by an adjustment member.

In some embodiments, the adjustment member can be rotatably engaged with the adjustment base. For example, the adjustment member may be a bolt or threaded rod extending between adjustment base and the support bracket assembly, wherein turning the bolt or threaded rod, or another fastener element (e.g., nut) coupled to the bolt or threaded rod moves the support bracket assembly away from or toward the adjustment base when fasteners used to mount the support bracket assembly to the enclosure are loosened. When a final position is attained, the fasteners, e.g., mounting fasteners or the adjustment member, can be tightened.

In some embodiments, the electrical flange support apparatus may further comprise an electrode bracing assembly coupled to the electrode portion and engaged with a support member.

The electrode bracing assembly can comprise, for example, a bracing rod extending between the electrode portion and the support member. The support member can be any suitable, stable structure capable of resisting deformation, such as bending, caused by pressure applied by the electrode portion. The bracing rod can be configured to maintain a predetermined separation between the electrode portion and the support member. For example, the bracing rod may include nuts or other fastener components that facilitate lengthening or shortening the effective length of the bracing rod between the electrode portion and the support member.

In some embodiments, the bracing rod can comprise an electrically isolating spacer. For example, in some embodiments, the electrically isolating spacer can be disposed on an end of the bracing rod and contact the support member.

In other embodiments, the bracing rod can comprise a first portion and a second portion, the first and second portions engaged with and separated by the electrically isolating spacer. In still further embodiments, the electrically isolating spacer can be disposed on an end of the bracing rod and contact the electrode portion of the electrical flange. In each embodiment, the electrically isolating spacer provides electrical isolation between the electrode portion, which can carry significant electrical current, and the support member.

In other embodiments, a glass manufacturing apparatus is disclosed comprising a metallic vessel configured to convey molten glass and an electrical flange attached to the metallic vessel, the electrical flange comprising an electrode portion extending away from the metallic vessel. An electrode bracing assembly couples the electrode portion to a support member.

The electrode bracing assembly can comprise a bracing rod extending between the electrode portion and the support member, the bracing rod configured to maintain a predetermined separation between the electrode portion and the support member.

In some embodiments, the bracing rod can comprise an electrically isolating spacer that electrically isolates the electrode portion from the support member. For example, the electrically isolating spacer can be positioned on an end of the bracing rod and contact the support member or the electrode portion.

In some embodiments, the bracing rod can comprise a first portion and a second portion, the first and second portions engaged with and separated by the electrically isolating spacer.

The glass manufacturing apparatus may further comprise an enclosure disposed about the metallic vessel, wherein the electrode portion extends through the enclosure, and a support bracket assembly can be mounted to the enclosure and coupled to the electrode portion.

In some embodiments, the support bracket assembly can comprise opposing attachment plates, with a clamping member disposed between and engaged with the opposing attachment plates, the clamping member coupled to the electrode portion.

In various embodiments, the clamping member can comprise tabs extending from ends thereof, the tabs engaged with openings defined by the attachment plates.

In some embodiments, the clamping member may be further coupled to the attachment plates by fasteners extending through the clamping member and the attachment plates.

The glass manufacturing apparatus may further comprise an adjustment assembly comprising an adjustment base mounted to the enclosure and coupled to the support bracket assembly by an adjustment member.

The adjustment member may be rotatably engaged with the adjustment base. For example, the adjustment member may be a bolt or threaded rod extending between adjustment base and the support bracket assembly, wherein turning the bolt or threaded rod, or other fastening element (e.g., nut) coupled to the bolt or threaded rod, moves the support bracket assembly away from or toward the adjustment base when fasteners used to mount the support bracket assembly to the enclosure are loosened. When a final position is attained, the fasteners can be tightened.

In other embodiments, methods of starting a glass manufacturing apparatus are disclosed, comprising positioning a first end of a first metallic conduit adjacent a second end of a second metallic conduit in a first alignment position such that a longitudinal axis of the first metallic conduit is coaxial with a longitudinal axis of the second metallic conduit, the first end comprising a first electrical flange attached thereto and the second end comprising a mating flange attached thereto, the first and second ends spaced apart by a first predetermined gap. The mating flange can be, for example, a second electrical flange. In accordance with embodiments, the first metallic conduit can be heated to an operating temperature, wherein during the heating the first metallic conduit expands and as a result the first longitudinal axis is not coaxial with the second metallic conduit. To correct the misalignment, an electrical flange support apparatus coupled to the first electrical flange can be adjusted during the heating to realign the first longitudinal axis with the second longitudinal axis. Accordingly, the support bracket assembly can be configured to be movable when the glass manufacturing apparatus is heated, such as during startup of the glass manufacturing apparatus, allowing movement of the bracket assembly and reducing stress on the electrical flange during startup. At the completion of startup, such as when the glass manufacturing apparatus has reached a steady-state operating temperature, the support bracket assembly can be secured, such as with fasteners, to secure the electrical flange.

The electrical flange support apparatus can be coupled to an electrode portion of the electrical flange.

In some embodiments, the electrode portion can comprise an angled part extending at an angle greater than zero and less than 90 degrees relative to horizontal, and a nominally vertical part, the electrical flange support apparatus comprising a support bracket assembly coupled to the nominally vertical part. During the adjusting the support bracket assembly can apply a force to the nominally vertical portion at an angle relative to horizontal equal to the angle of the angled part.

In some embodiments, the first metallic conduit can be coupled to a fining vessel. In some embodiments, the second metallic conduit can be coupled to a melting vessel.

In various embodiments, the heating reduces the predetermined gap. At the completion of heating, when the first connecting conduit has reached an operating temperature, molten glass can be flowed through the first and second metallic conduits such that molten glass fills the reduced gap. The molten glass in the reduced gap cools and solidifies, sealing the first metallic conduit to the second metallic conduit.

In some embodiments, the electrical flange support apparatus further comprises a electrode portion bracing assembly bracing the electrode portion.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
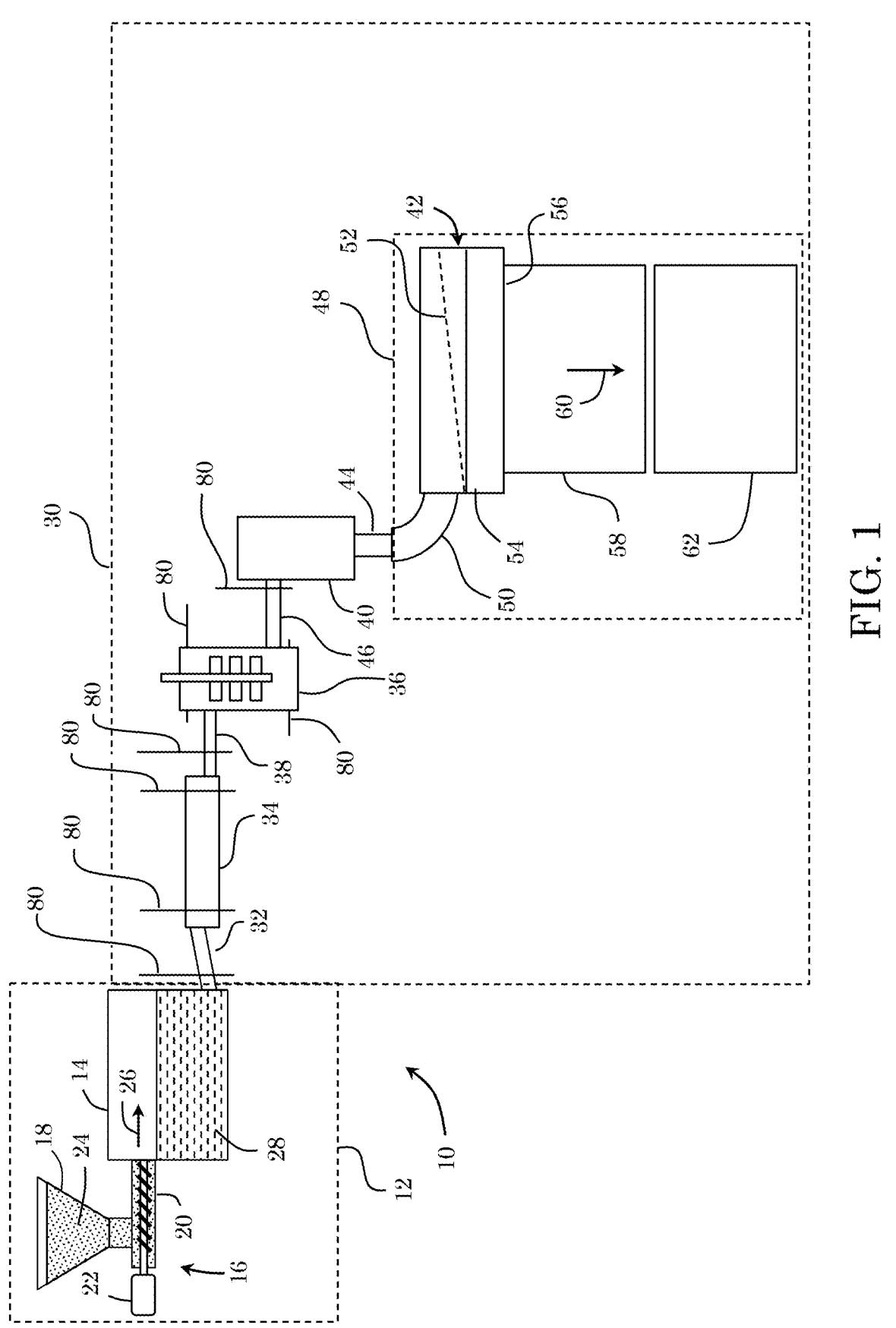
FIG. 1 is a schematic view of an exemplary glass manufacturing apparatus according to embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the term "electrically connected," "electrically connecting," and variations thereof, mean connected by way of an electrical conductor not including a molten material (e.g., molten glass). A first element electrically connected to a second element can include additional elements between the first element and the second element such that the additional elements are also electrically connected to the first element and the second element. That is, a first element electrically connected to a second element is not to be construed as precluding the presence of additional conducting elements in the connection. Typically, such electrical conductors can comprise metallic wiring or cabling, buss bars, and the like, but are not limited thereto. The electrical connection may further include other components, including but not limited to electrical connectors (e.g., plugs, tabs, lugs, bolts, etc.) that facilitate connection between components, electrical control devices such as electrical current and/or voltage controllers, electrical current and/or voltage measurement devices, and the like.

As used herein, "refractory" refers to non-metallic materials having chemical and physical properties making them applicable for structures, or as components of systems, that are exposed to environments above 538° C.

Shown in FIG. 1 is an exemplary glass manufacturing apparatus 10. In some embodiments, the glass manufacturing apparatus 10 can comprise a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material.

In further embodiments, glass melting furnace 12 can include other thermal management devices (e.g., isolation components) that reduce heat loss from the melting vessel. In still further embodiments, glass melting furnace 12 can include electronic and/or electromechanical devices that facilitate melting of the raw material into a glass melt. Glass melting furnace 12 can include support structures (e.g., support chassis, support member, etc.) or other components.

Melting vessel 14 can be formed from a refractory material, such as a refractory ceramic material, for example a refractory ceramic material comprising alumina or zirconia, although the refractory ceramic material can comprise other refractory materials, such as yttrium (e.g., yttria, yttria-stabilized zirconia, yttrium phosphate), zircon ($ZrSiO_4$) or alumina-zirconia-silica or even chrome oxide, used either alternatively or in any combination. In some examples, melting vessel 14 may be constructed from refractory ceramic bricks.

In some embodiments, glass melting furnace 12 can be incorporated as a component of a glass manufacturing apparatus configured to fabricate a glass article, for example a glass ribbon, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw style glass manufacturing apparatus 10 for fusion drawing a glass ribbon for subsequent processing into individual glass sheets or rolling the glass ribbon onto a spool. As used herein, fusion drawing comprises flowing molten glass over both sides surfaces of a forming body, wherein the resulting two streams of molten material join, or "fuse," at the bottom of the forming body.

Glass manufacturing apparatus 10 can optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20 and a motor 22 connected to raw material delivery device 20. Raw material storage bin 18 can be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from raw material storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as various "sands". Raw material 24 can also include scrap glass (i.e. cullet) from previous melting and/or forming operations. Combustion burners are typically used to begin the melting process. In an electrically boosted melting process, once the electrical resistance of the raw material is sufficiently reduced, electric boost can begin by developing an electrical potential between electrodes positioned in contact with the raw material, thereby establishing an electrical current through the raw material, the raw material typically entering, or in, a molten state. As used herein, the resultant molten material shall be referred to as molten glass.

Glass manufacturing apparatus 10 can also optionally include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12.

Downstream glass manufacturing apparatus 30 can include a first conditioning (i.e. processing) chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. Accordingly, first connecting conduit 32 provides a flow path for molten glass 28 from melting vessel 14 to fining vessel 34. It should be understood, however, that other conditioning chambers may be positioned downstream of melting vessel 14, for example between melting vessel 14 and fining vessel 34. In some embodiments, a conditioning chamber can be employed between the melting vessel and the fining chamber. For example, molten glass from a primary melting vessel can be further heated in a secondary melting (conditioning) vessel or cooled in the secondary melting vessel to a temperature lower than the temperature of the molten glass in the primary melting vessel before entering the fining chamber.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although the use of arsenic and antimony may be discouraged for environmental reasons in some applications. Fining vessel 34 is heated, for example to a temperature greater than the melting vessel temperature, thereby heating the fining agent. Oxygen produced by the temperature-induced chemical reduction of one or more fining agents included in the molten glass rise through the molten glass within the fining vessel can coalesce or diffuse into bubbles produced during the melting process. The enlarged gas bubbles with increased buoyancy can then rise to a free surface of the molten glass within the fining vessel and thereafter be vented out of the fining vessel.

The downstream glass manufacturing apparatus 30 can further include another conditioning chamber, such as mixing apparatus 36, for example a stirring vessel, for mixing the molten glass that flows downstream from fining vessel 34. Mixing apparatus 36 can be used to provide a homogenous glass melt composition, thereby reducing chemical or thermal inhomogeneities that may otherwise exist within the molten glass exiting the fining chamber. As shown, fining vessel 34 may be coupled to mixing apparatus 36 by way of a second connecting conduit 38. In some embodiments, molten glass 28 can be gravity fed from the fining vessel 34 to mixing apparatus 36 by way of second connecting conduit 38. For instance, gravity may drive molten glass 28 through an interior pathway of second connecting conduit 38 from fining vessel 34 to mixing apparatus 36. Typically, the molten glass within mixing apparatus 36 includes a free surface, with a free volume extending between the free surface and a top of the mixing apparatus. While mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These mixing apparatus may be of the same design, or they may be of a different design from one another. In some embodiments, one or more of the vessels and/or conduits can include static mixing vanes positioned therein to promote mixing and subsequent homogenization of the molten material.

Downstream glass manufacturing apparatus 30 can further include another conditioning chamber such as delivery vessel 40 located downstream from mixing apparatus 36. Delivery vessel 40 can condition molten glass 28 to be fed into a downstream forming device. For instance, delivery vessel 40 can act as an accumulator and/or flow controller to adjust and provide a consistent flow of molten glass 28 to forming body 42 by way of exit conduit 44. The molten glass within delivery vessel 40 can, in some embodiments, include a free surface, wherein a free volume extends upward from the free surface to a top of the delivery chamber. As shown, mixing apparatus 36 can be coupled to delivery vessel 40 by way of third connecting conduit 46. In some examples, molten glass 28 can be gravity fed from mixing apparatus 36 to delivery vessel 40 by way of third connecting conduit 46. For instance, gravity can drive molten glass 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down-draw glass making apparatus can comprise a trough 52 positioned in an upper surface of the forming body, and converging forming surfaces 54 (only one surface shown) that converge in a draw direction along a bottom edge (root) 56 of the forming body. Molten glass delivered to forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 56 to produce a single ribbon 58 of molten glass that is drawn along a draw plane in a draw direction 60 from root 56 by applying a downward tension to the glass ribbon, such as by gravity and/or pulling roll assemblies (not shown), to control the dimensions of the glass ribbon as the molten glass cools and a viscosity of the material increases. Accordingly, glass ribbon 58 goes through a viscoelastic transition to an elastic state and acquires mechanical properties that give glass ribbon 58 stable dimensional characteristics. Glass ribbon 58 may in some embodiments be separated into individual glass sheets 62 by a glass separation apparatus (not shown), while in further embodiments, the glass ribbon may be wound onto spools and stored for further processing.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof.

Although elements of the glass manufacturing apparatus 10 are shown and described as fusion downdraw glass making elements, principles of the present disclosure can be applied to a wide variety of glass making processes. For example, melting vessels according to embodiments of the present disclosure can be used in such diverse glass making processes as fusion processes, slot draw processes, rolling processes, pressing processes, float processes, tube drawing processes, and so forth.

To provide an appropriate viscosity of the molten glass as the molten glass flows through the downstream glass manufacturing apparatus 30 to forming apparatus 48, various components of the downstream glass making apparatus can be temperature controlled, such as by heating and/or cooling of the molten glass. For example, refractory isolating material can be placed about various metallic vessels comprising the downstream glass making apparatus to control heat loos from the metallic vessels. In some embodiments, the metallic vessels can be heated, for example with heating elements proximate the metallic vessels. In some embodiments, an electric current can be established through one or more of the metallic vessels, thereby heating the metallic vessels by direct resistance heating (hereafter, "direct" or "directly" heating). Such directly heated vessels can include one or more of first connecting conduit 32, fining vessel 34, mixing apparatus 36, second connecting conduit 38 extending between fining vessel 34 and mixing apparatus 36, delivery vessel 40, third connecting conduit 46 extending between mixing apparatus 36 and delivery vessel 40, and exit conduit 44. Directly heated vessels may further include forming vessel inlet conduit 50.

To facilitate delivery of an electric current to directly heated vessels, the directly heated vessels can be provided with electrical current delivery devices configured to provide an electrical current path between cables or bus bars electrically connected to an electrical power source (not shown), and the one or more directly heated vessels. In various embodiments, such electrical current delivery devices are configured to reduce circumferential non-uniformity in the electrical current delivered to the metallic vessels. Accordingly, in various embodiments, such electrical current delivery devices can extend about an outer periphery of the metallic vessel and are referred to hereinafter as "electrical flanges" 80, and, as shown in FIG. 1, can be deployed at various locations throughout the downstream glass manufacturing apparatus 30. It should be noted that pairs of the electrical flanges 80 can be electrically connected to different electrical phases of multiphase power sources so that temperatures of individual regions of the metallic vessels can be independently controlled to produce one or more heating zones of the same or different temperatures. Thus, the numbers and locations of the electrical flanges is dependent at least on the number of desired heating zones and the physical configuration of the vessel to which the electrical flanges are attached, and the number and location of electrical flanges depicted in FIG. 1 are for purposes of description and not limitation.

Figures 2A, 2B:
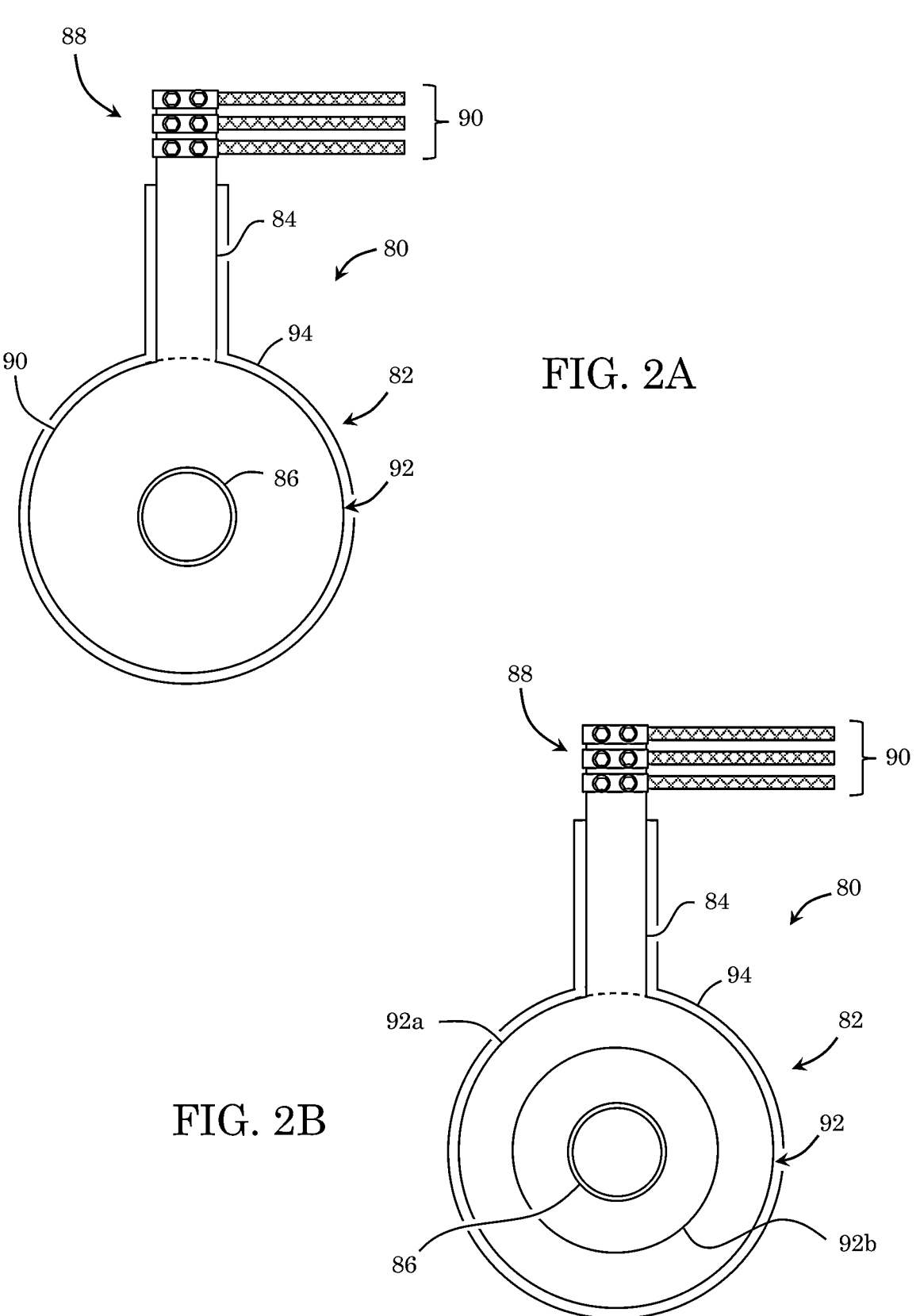
FIG. 2A is a front view of an exemplary electrical flange comprising a ring-shaped central disc.
FIG. 2B is a front view of another electrical flange comprising multiple rings, including an innermost ring and an outermost ring.

FIG. 2A is a front view of an exemplary electrical flange 80 comprising a body portion 82 and an electrode portion 84 extending outward from body portion 82. As shown, body portion 82 can be circular, but other shapes are also possible, for example elliptical, egg-shaped, and so forth. Body portion 82 can be configured to extend about an outer periphery of an exemplary metallic vessel, e.g., conduit 86. While exemplary conduit 86 is shown as a cylindrical conduit with a circular cross-sectional shape in a plane orthogonal to a longitudinal axis of the conduit, conduit 86 may have other cross-sectional shapes, such as rectangular, elliptical, or a combination of circular, rectangular, and/or elliptical shapes.

Electrode portion 84 of electrical flange 80 provides a connection point 88 for electrical conductors 90 (e.g., cables, bus bars, etc.) extending between an electrical power source (not shown) and electrical flange 80. While electrode portion 84 is shown extending vertically upward from body portion 82 in FIG. 2A, electrode portion 84 can extend in other orientations, for example horizontally outward or at any other angle between vertical and horizontal.

In some embodiments, body portion 82 can comprise a ring 92 extending around the periphery of conduit 86, as illustrated in FIG. 2A. Ring 92 may be substantially discshaped, for example a disc-shaped annulus. In some embodiments, shown in FIG. 2B, ring 92 can comprise a plurality of rings. For example, body portion 82 can comprise an outermost ring 92a and an innermost ring 92b. In various embodiments, innermost ring 92b can be formed from the same or similar metal as the metallic vessel to which it is attached. For example, exemplary conduit 86 can comprise platinum, in which instance innermost ring 92b can also comprise platinum such that innermost ring can resist the high temperature of exemplary conduit 86 when heated by an electrical current. Since outermost ring 92a is spaced radially apart from conduit 86 and separated by at least innermost ring 92b, outermost ring 92a can be formed from a less expensive metal less able to withstand the high temperature at conduit 86. For example, outermost ring 92a, and electrode portion 84, can comprise nickel. Body portion 82 may further comprise additional, intermediate rings positioned radially between outermost ring 92a and innermost ring 92b. Such intermediate rings can comprise nickel or platinum, as the need dictates. For example, intermediates rings positioned between outermost ring 92a and innermost ring 92b can comprise platinum. Such intermediate rings can have a thickness equal to the thickness of innermost ring 92b, or such intermediate rings can have a thickness that differs from innermost ring 92b. In some embodiments, the thickness of the rings can increase as a function of radial distance from conduit 86. Moreover, because outermost ring 92a is spaced apart from conduit 86 and can be formed from a less expensive metal than innermost ring 92b, outermost ring 92a can be made thicker than innermost ring 92b and/or platinum-containing intermediate rings positioned therebetween. The additional mass of outermost ring 92a can provide greater heat resistance to outermost ring 92a, but simultaneously adds additional weight to electrical flange 80.

In various embodiments, electrical flange 80 may be provided with a cooling device 94, such as a cooling tube extending around an outer periphery of body portion 82 and or electrode portion 84. A cooling fluid, for example water, can be flowed through a passage in the cooling tube to extract heat from the electrical flange and prevent thermal damage thereto.

Figure 3:
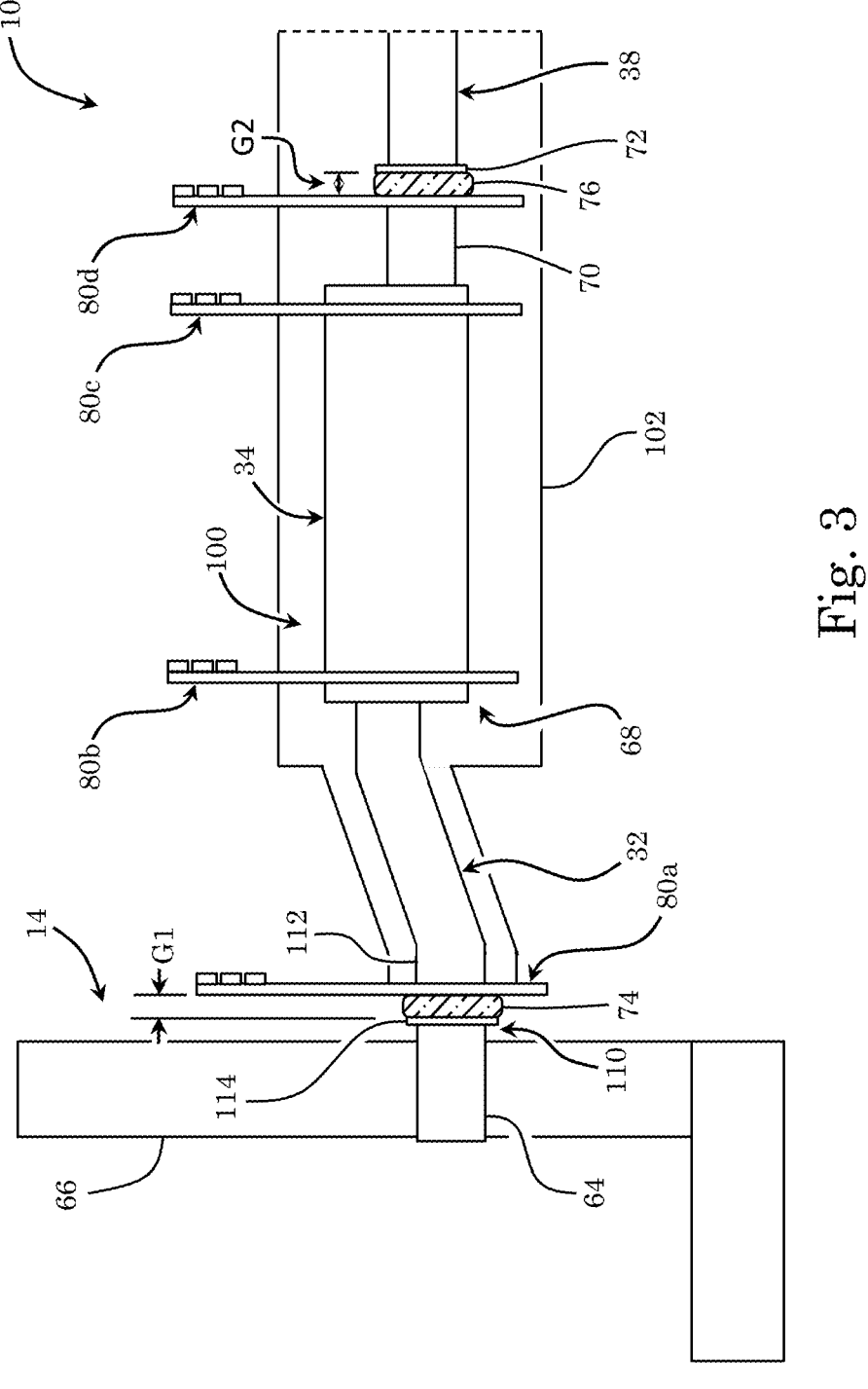
FIG. 3 is a cross-sectional side view of a portion of the glass manufacturing apparatus of FIG. 1 illustrating glass seals between metallic vessel portions.

FIG. 3 illustrates a portion of glass manufacturing apparatus 10 comprising an exemplary melting vessel 14, first connecting conduit 32 and at least a portion of second connecting conduit 38. In accordance with the present embodiment. Glass making apparatus may further comprise an exit tube 64 extending through a refractory wall e.g., front wall 66, of melting vessel 14 in a direction toward fining vessel 34, exit tube 64 comprising a passage for conveying molten glass 28 from an interior of melting vessel 14. First connecting conduit 32 can extend from first end 68 of fining vessel 34 in a direction toward melting vessel 14. In the embodiment of FIG. 3, first connecting conduit 32 and fining vessel 34 can be rigidly joined, for example welded together, so that first connecting conduit 32 and fining vessel 34 are physically and electrically connected.

Fining vessel 34 may further comprise a tail portion 70 extending in a direction toward mixing apparatus 36. Second connecting conduit 38 may be rigidly joined, such as by welding, and electrically connected, to mixing apparatus 36 and extend therefrom in a direction toward fining vessel 34. In accordance with various embodiments, first connecting conduit 32 and exit tube 64 can be separated by a gap, but sealed with a glass seal, as will be described in more detail below. Similarly, tail portion 70 and second connecting conduit 38 can be separated by a gap and sealed with a glass seal within the gap.

During heat-up of glass manufacturing apparatus 10, for example during an initial startup of the glass manufacturing apparatus, the metallic vessels of the glass manufacturing apparatus may expand, for example in an expansion direction coinciding with a longitudinal axis of the individual vessels. For example, the fining vessel, e.g., fining vessel 34, can be an elongate tube extending along a longitudinal axis. Accordingly, the fining vessel can expand along an expansion direction corresponding to, such as generally parallel to, a longitudinal axis of the fining vessel. Similarly, various other vessels (e.g., conduits), may also expand along their respective longitudinal axes. If the various metallic vessels of the glass manufacturing apparatus are rigidly connected, for example by welding or bolting, considerably stress can be applied to these metallic vessels. Because many of the metallic vessels of glass manufacturing apparatus 10 are formed from a precious metal, e.g., platinum or alloys thereof, and thus can represent considerable cost, the walls of the vessels are made thin, but therefore unable to tolerate significant stress without damage, such as shearing, buckling, or other deformation. To avoid stress related to thermal expansion of the metallic vessels, certain metallic vessels, or groups of metallic vessels, may not be rigidly joined. Instead, adjacent vessels, or assemblies of vessels, may instead be aligned and positioned proximate each other, but separated by a gap to accommodate thermal expansion.

Once heat-up of the glass manufacturing apparatus is completed, the adjacent vessel, or assembly of vessels, not rigidly connected, can be further moved, such as rolled on tracks, to close substantially all the remaining gap, leaving a small portion of the gap, for example a gap equal to or less than about one quarter of a centimeter. After batch materials are melted in the melting vessel to form molten glass and the molten glass begins flowing through the metallic vessels, the molten glass seeps through the remaining gap between adjacent metallic vessels. Cooling of the seeping molten glass in the gap between adjacent vessels or assemblies of vessels, for example by exposure to the surrounding environment, causes the gap to be filled and plugged, limiting continued flow of the molten glass from the gap.

In the embodiment of FIG. 3, first connecting conduit 32, fining vessel 34 (including tail portion 70) can be rigidly and electrically connected to form metallic vessel assembly 100 comprising a contiguous passage therethrough. In some embodiments, metallic vessel assembly 100 can be contained within an enclosure 102, for example a metallic enclosure. In some embodiments, enclosure 102 may be configured for controlling an atmosphere between walls of metallic vessel assembly 100 and walls of enclosure 102. For example, in some embodiments, enclosure 102 may be in fluid communication with a source of hydrogen to control a partial pressure of hydrogen within the atmosphere. By maintaining a partial pressure of hydrogen within the metallic enclosure at a predetermined concentration or within a predetermined concentration range, hydrogen permeation can be controlled. Hydrogen permeation refers to the breakdown of water contained within the molten glass, and a subsequent passage of hydrogen from the molten glass flowing within the metallic vessel assembly through the walls of the metallic vessel assembly to the atmosphere outside the metallic vessel assembly walls. Oxygen left behind in the molten glass can form small bubbles (e.g., blisters), in the molten glass, which may be detrimental to a subsequently-formed glass product. Refractory isolating material may be disposed between metallic vessel assembly 100 and enclosure 102 to control heat loss from the walls of the metallic vessel assembly and to provide support to the thin-walled metallic vessel assembly. While not shown, enclosure 102 may further comprise a skeleton or frame for supporting enclosure 102 and its contents.

As described above, metallic vessel assembly 100 may further comprise a plurality of electrical flanges 80 arranged and configured to heat metallic vessel assembly 100 by conducting an electrical current through the metallic vessel assembly. For convenience, flanges 80 in FIG. 3 are designated as flanges 80a-80d, from left to right in a direction of flow of molten glass 28. While four electrical flanges are shown, there may be more or less than four electrical flanges attached to metallic vessel assembly 100 depending on need, for example depending on the number of temperature zones desired.

Prior to heating up the glass manufacturing apparatus, metallic vessel assembly 100 can be moved into position such that first connecting conduit 32 is aligned with exit tube 64. That is, such that a center longitudinal axis of first connecting conduit 32 nearest exit tube 64 is positioned to be parallel to and coaxial with a center longitudinal axis of exit tube 64. Similarly, tail portion 70 can be aligned with second connecting conduit 38, wherein second connecting conduit 38 may be provided with a scaling flange 72 configured opposite electrical flange 80d. Metallic vessel assembly 100 may then be positioned such that gaps G1 and G2 are formed between free ends of first connecting conduit 32 and exit tube 64, and between free ends of second connecting conduit 38 and tail portion 70 (e.g., between electrical flange 80d and scaling flange 72), respectively. In some embodiments, sealing flange 72 at the free end of second connecting conduit 38 may be an electrical flange. As metallic vessel assembly 100 is heated via electrical flanges 80, metallic vessel assembly 100 expands in a length-wise direction, thereby reducing, but not eliminating, G1 and G2. Subsequent molten glass flow from melting vessel 14 through metallic vessel assembly 100 seeps into gaps G1 and G2, forming glass seal 74 and glass seal 76 within gap G1 and gap G2, respectively, seals first connecting conduit 32 to exit tube 64, and second connecting conduit 38 to tail portion 70. Described more generally, metallic vessel assembly 100 is not rigidly connected to exit tube 64 and second connecting conduit 38 but is separated therefrom by gaps so that during heating up of the glass manufacturing apparatus there is room for the components to thermally expand. Once heat up is concluded, molten glass flows into and solidifies to form a glass seal in the gaps to prevent further leakage.

To ensure a robust glass seal, distal end 110 of exit tube 64 may be fitted with a scaling flange 114. In some embodiments, sealing flange 114 may be an electrical flange, for example an electrical flange 80. In some embodiments, an electrical flange 80 (e.g., electrical flange 80a) may be positioned at distal (free) end 112 of first connecting conduit 32 and which electrical flange functions both as an electrical conductor that conducts an electrical current to metallic vessel assembly 100, and as a sealing flange such that glass seal 74 is formed in gap G1 between sealing flange 114 of exit tube 64 and electrical flange 80a.

It should be noted from the foregoing that during expansion of metallic vessel assembly 100, electrical flanges 80a-80d, rigidly attached to the walls of metallic vessel assembly 100, move in unison. More particularly, the respective body portions 82 move as metallic vessel assembly 100 expands. However, movement of the electrical flanges is hampered by their connection to electrical conductors 90 (e.g., cables, buss bars, etc.) providing the electrical current from the electrical power source to the electrical flanges. Thus, while the body portions of electrical flanges 80a-80d move with metallic vessel assembly 100 to which the body portions 82 are attached, the electrode portions 84 may be constrained by the electrical conductors to which they are attached, and therefore unable to move, or move very little compared to the respective body portions.

Figure 4:
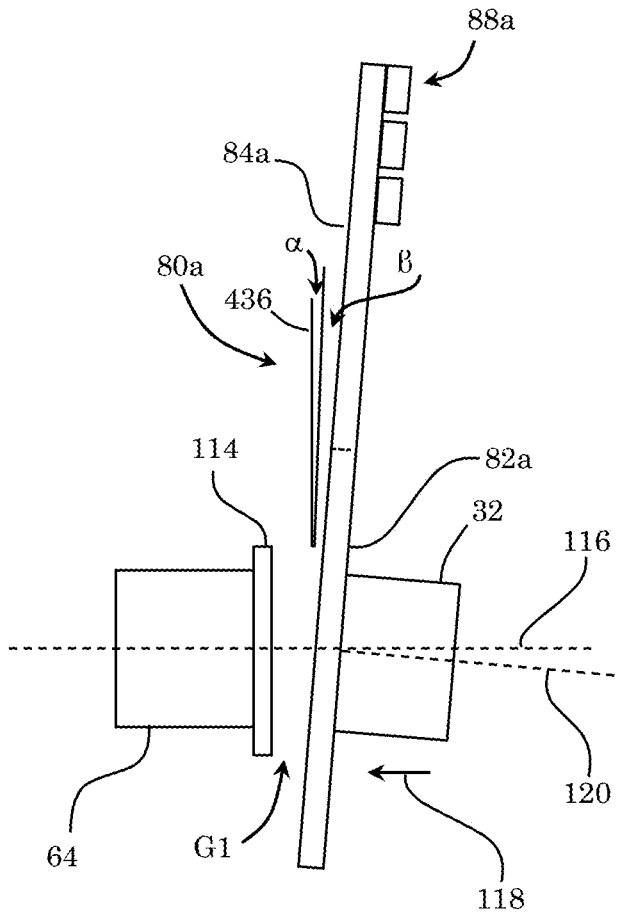
FIG. 4 is a side view of a portion of FIG. 3 illustrating misalignment between vessel portions that may occur during heat-up of the glass manufacturing apparatus because of the weight of improperly-supported electrical flanges.

An at least partially constrained electrode portion 84 may be problematic for electrical flanges that serve also as sealing flanges. For example, referring to FIG. 4, expansion of metallic vessel assembly 100 along longitudinal axis 116 of exit tube 64 in direction 118 moves body portion 82a of electrical flange 80a toward exit tube 64, but the heavy, stiff electrical conductors attached at connection point 88a of electrode portion 34a at least partially constrain movement of the electrode portion, resulting in a tilting of the electrical flange that produces misalignment of longitudinal axis 120 of first connecting conduit 32 relative to longitudinal axis 116. Because electrical flange 80a is rigidly attached to first connecting conduit 32, tilting of electrical flange 80a can apply mechanical stress to metallic vessel assembly 100 that can warp, crumple, or otherwise damage the metallic vessel assembly. Additionally, misalignment of electrical flange 80a relative to sealing flange 114 (such that sealing flange 114 and electrical flange 80a are no longer parallel) can lead to an incomplete glass seal, which can result in molten glass leaks. Moreover, corrosive gases emitted from molten glass 28 can escape from the incomplete glass seal and damage surrounding equipment, including but not limited to exit tube 64 and first connecting conduit 32.

In various embodiments, electrical conductors electrically connected with electrical flanges 80 can be supported by slings, cradles or other devices configured to support the weight of the electrical conductors and provide limited movement of the electrical conductors. For example, several exemplary devices are described and illustrated in U.S. Patent Application No. 62/635,080 filed on Feb. 26, 2018. However, even when provided with limited movement, the significant stiffness of the electrical conductors, configured to conduct large electrical currents, may still impede movement of the electrical flange. Such impeded movement may continue to result in tilting of the electrical flange.

Figure 5:
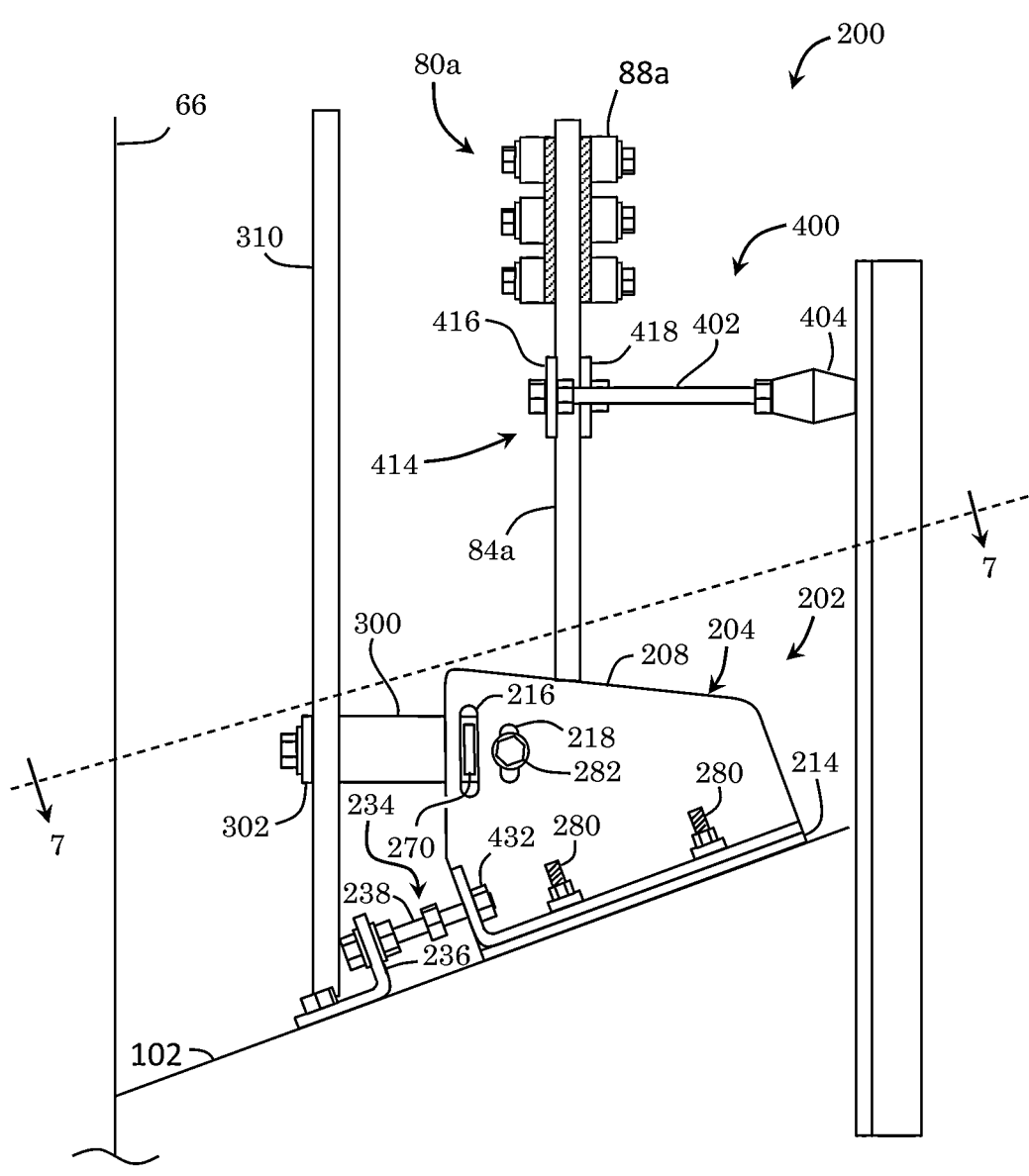
FIG. 5 is a side view of an exemplary electrical flange support assembly from one side of the support assembly.
Figure 6:
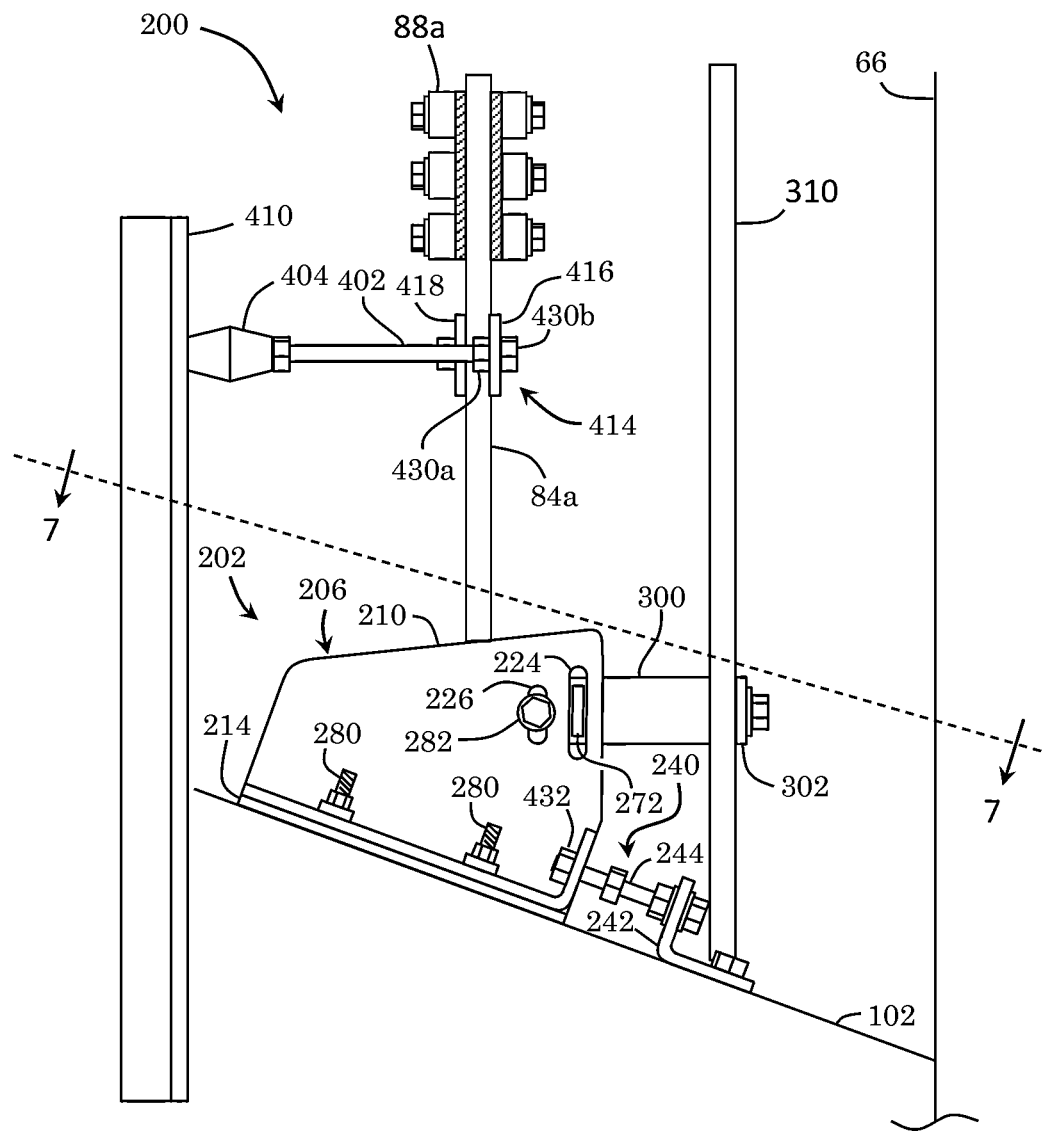
FIG. 6 is a side view of the electrical flange support assembly of FIG. 5 as seen from the opposite side of the support assembly.
Figure 7:
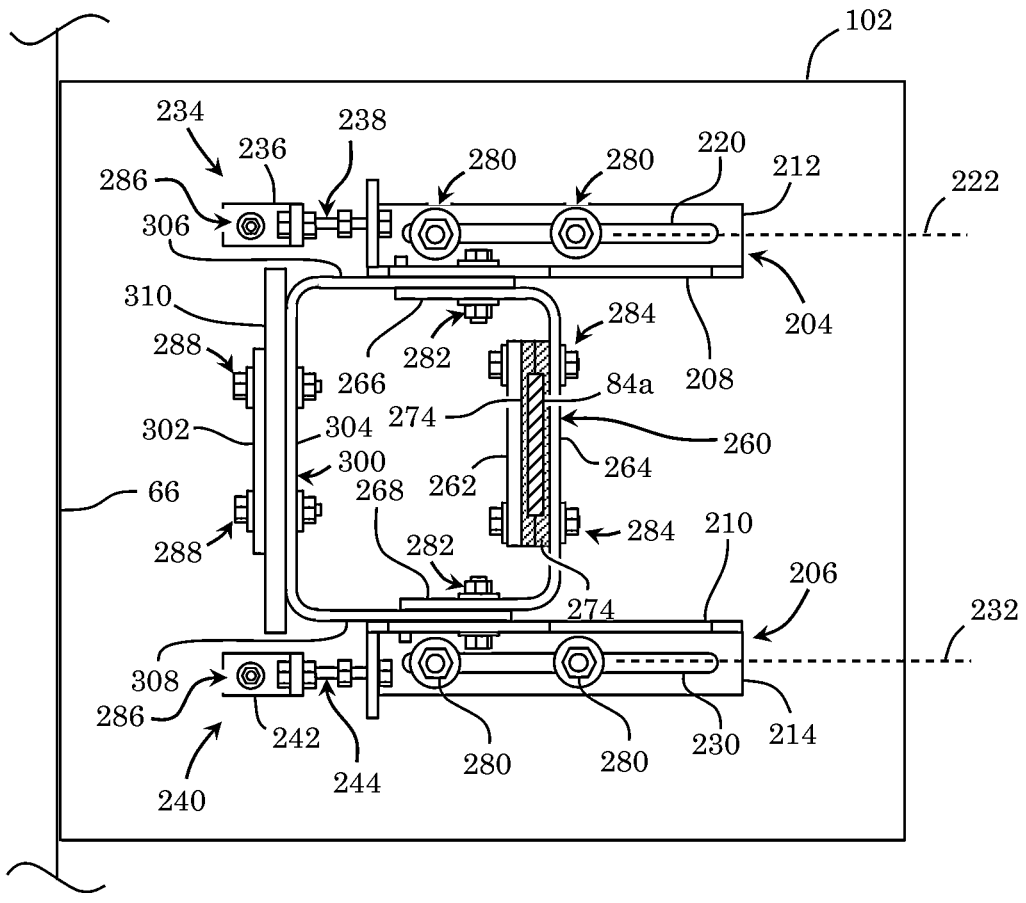
FIG. 7 is a top view of a portion of the electrical flange support assembly of FIGS. 5 and 6.

Accordingly, FIGS. 5-7 depict an exemplary electrical flange support apparatus 200 configured to minimize or prevent tilting of an electrical flange to which electrical flange support apparatus 200 is engaged. The following description will be presented relative to electrical flange 80a electrically connected to first connecting conduit 32, with the understanding that the electrical flange support apparatus, or variations thereof, can be used in other location within glass manufacturing apparatus 10.

FIGS. 5 and 6 are side views of an exemplary electrical flange support apparatus 200 including a support bracket assembly 202 comprising first bracket 204 and second bracket 206, first and second brackets 204, 206 configured for mounting to a rigid support member. In some embodiments, first and second brackets 204, 206 can be similar. For example, in some embodiments, first and second brackets 204, 206 can be mirror images of each other. In further embodiments, first and second brackets 204 and 206 can be integrally formed, for example as ends of a suitably-bent plate.

First and second brackets 204, 206 can comprise first and second attachment plates 208, 210, respectively. First and second brackets 204, 206 may further include first and second mounting bases 212, 214, respectively, for mounting first and second brackets 204, 206 to a support body. For example, in various embodiments, first and second brackets 204, 206 can be mounted to enclosure 102 via first and second mounting bases 212, 214, although any rigid support body that does not move appreciably during heat-up of the glass making apparatus is suitable.

First attachment plate 208 can define a first opening 216 and a second opening 218. First opening 216 can be an elongated slot, whereas second opening 218 can be, for example a circular opening or an elongated slot. As described above, first bracket 204 can comprise first mounting base 212. For example, in some embodiments, first mounting base 212 may be a portion of first attachment plate 208 that has been bent at an angle relative to a plane of first attachment plate 208, for example at an angle of 90 degrees so that a plane of first mounting base 212 is orthogonal to a plane of first attachment plate 208. In various embodiments, first mounting base 212 defines at least one mounting slot 220. Mounting slot 220 can be oriented to extend along a length-wise direction of first mounting base 212, e.g., along first mounting axis 222. In some embodiments, first mounting base 212 can comprise a plurality of mounting slots 220 arranged along first mounting axis 222.

Like first attachment plate 208, second attachment plate 210 (see FIG. 6) can define a first opening 224 and a second opening 226. First opening 224 can be an elongated slot, whereas second opening 226 can be, for example a circular opening or an elongated slot. As described above, second bracket 206 can comprise second mounting base 214. For example, in some embodiments, second mounting base 214 may be a portion of second attachment plate 210 that has been bent at an angle relative to a plane of second attachment plate 210, for example at an angle of 90 degrees so that second mounting base 214 is orthogonal to second attachment plate 210. In various embodiments, second mounting base 214 can define at least one elongate mounting slot 230. Mounting slot 230 can be oriented to extend along a length-wise direction of second mounting base 214, e.g., along second mounting axis 232. In some embodiments, second mounting base 214 can comprise a plurality of mounting slots 230 arranged along second mounting axis 232. In various embodiments, second mounting axis 232 can be parallel to first mounting axis 222

Electrical flange support apparatus 200 may further comprise first adjustment assembly 234 comprising first adjustment base 236 and first adjustment member 238 extending between first adjustment base 236 and first bracket 204 (e.g., first attachment plate 208). First adjustment member 238 may be a rod, for example a threaded rod, such as a bolt. First adjustment member 238 can be coupled to first adjustment base 236 and first bracket 204, using suitable fastening members (e.g., nuts), and configured such that rotation of the fastening members increases or decreases a distance between first adjustment base 236 and first bracket 204 depending on the direction of rotation of the fastening members. Put differently, first adjustment member 238 can comprise a bolt or other threaded rod and include nuts engaged therewith such that turning the one or more nuts can increase or decrease the length of adjustment member extending between first adjustment base 236 and first bracket 204, thereby moving first bracket 204 relative to first adjustment base 236. Additionally, first adjustment member 238 may be locked (e.g., tightened, such as with one or more nuts) to thereby rigidly connect first adjustment base 236 and first bracket 204.

Similarly, electrical flange support apparatus 200 may further comprise second adjustment assembly 240 comprising second adjustment base 242 and second adjustment member 244 extending between second adjustment base 242 and second bracket 206 (e.g., second attachment plate 210). Second adjustment member 244 may be a rod, for example a threaded rod, such as a bolt. Second adjustment member 244 can be coupled to second adjustment base 242 and second bracket 206, using suitable fastening members (e.g., nuts), and configured such that rotation of the fastening members increases or decreases a distance between second adjustment base 242 and second bracket 206 depending on the direction of rotation of the fastening members. Put differently, first adjustment member 238 can comprise a bolt or other threaded rod and include nuts engaged therewith and configured such that turning the one or more nuts can increase or decrease the length of adjustment member extending between second adjustment base 242 and second bracket 206, thereby moving second bracket 206 relative to second adjustment base 242. Additionally, second adjustment member 244 may be locked (e.g., tightened, such as with one or more nuts) to thereby rigidly connect second adjustment base 242 and second bracket 206.

First bracket 204 and second bracket 206 are mounted to a suitable support body, such as enclosure 102, in a spaced apart relationship, wherein first attachment plate 208 and second attachment plate 210 may be substantially parallel with each other. That is, a plane of first attachment plate 208 may be substantially parallel with a plane of second attachment plate 210. First bracket 204 and second bracket 206 may be mounted to the support body via one or more fasteners 280 (e.g., screws, nuts and bolts, etc.) extending through mounting slot 220 and mounting slot 230 and secured to the supporting body. Mounting slot 220 and mounting slot 230 allow for temporary movement of first bracket member assembly 204 and second bracket member assembly 206 along first mounting axis 222 and second mounting axis 232 prior to tightening of fasteners 280.

Similarly, first adjustment assembly 234 and second adjustment assembly 240 can be mounted to the same support body as first and second brackets 204 and 206. Additionally, first and second adjustment members 238 and 244 can be arranged to extend between their respective adjustment bases and brackets at the same angle (e.g., relative to horizontal) as the angle of the plane of the support base to which they are mounted, e.g., enclosure 102.

In various embodiments, support bracket assembly 202 may further comprise first clamping member 260 and second clamping member 262. In some embodiments, first clamping member 260 can comprise a "U"-shaped bar comprising a central clamping portion 264, and leg portions 266, 268 extending therefrom and connected to first attachment plate 208 and second attachment plate 210, respectively. For example, leg portions 266, 268 may extend orthogonal to central clamping portion 264. Leg portions 266, 268 may further comprise tabs 270, 272 extending respectively therefrom (e.g., from opposing ends of first clamping member 260) and sized to fit within first openings 216, 224 defined by first and second attachment plates 208, 210 respectively. In addition, leg portions 266, 268 may further define additional respective openings sized to receive fasteners 282, e.g., nuts and bolt combination, configured to couple first clamping member 260 to and between first attachment plate 208 and second attachment plate 210. Second clamping member 262 may be a linear (e.g., straight) bar, for example an elongate plate, wherein a length of second clamping member 262 can be greater than a width of electrode portion 34a. Second clamping member 262 can be coupled to first clamping member 260 via fasteners 284 such that electrode portion 84a is captured between first clamping member 260 and second clamping member 262. In some embodiments, electrode portion 84a may be electrically isolated from first and second clamping members 260, 262 by an isolating material 274 disposed between electrode portion 84a and the respective first and second clamping members 260, 262. First and second clamping members 260, 262 help support electrode portion 34a, and therefore electrical flange 80a. During heating up of the glass manufacturing apparatus, fasteners 282 coupling first clamping member 260 to attachment plates 208, 210 can be left loose, thereby accommodating some movement of electrode portion 34a. However, tabs 270, 272 positioned in openings 216, 224 limit such movement. That is, tabs 270, 272 limit downward movement of the electrode portion.

Referring still to FIGS. 5-7, first adjustment base 236 and second adjustment base 242 can be coupled to the support body, e.g., enclosure 102, via suitable fasteners 286 (screws, nuts and bolts, etc.). Fasteners 286 can be tightened to the support body so that first adjustment base 236 and second adjustment base 242 provide suitably rigid anchor points. With fasteners 280 loosened such that first and second attachment plates are movable relative to the support body, first adjustment member 238 and second adjustment member 244 can be rotated, thereby moving first and second brackets 204, 206 in a direction parallel with first mounting axis 222 and second mounting axis 232 and relative to first adjustment base 236 and second adjustment base 242. When first attachment plate 208 and second attachment plate 210 have been positioned in the desired location, fasteners 280 can be tightened. With electrode portion 84a clamped between first clamping member 260 and second clamping member 262, movement of first bracket 204 and second bracket 206 can be used to move electrical flange 80a into an upright orientation, aligned with (e.g., parallel to) scaling flange 114 (e.g., wherein longitudinal axis 116 is coaxial with longitudinal axis 120).

Support bracket assembly 202 may still further comprise third clamping member 300 and optional fourth clamping member 302. Third clamping member 300 can include a central portion 304 and two opposing leg portions 306 and 308 extending therefrom. For example, in some embodiments, leg portions 306 and 308 can extend orthogonal to central portion 304. In some embodiments, leg portions 306 and 308 can be positioned between leg portions 266 and 268, and first and second attachment plates 208, 210. For example, while not shown, leg portions 306 and 308 may define openings coinciding with first openings 216 and 224 for receiving tabs 270 and 272, respectively. Leg portions 306 and 308 may further comprise additional openings coinciding with second openings 218 and 226 and sized to receive fasteners 282. In some embodiments, third clamping member 300 can be coupled to a support member 310, such as with one or more fasteners 288. Support member 310 can, in some embodiments, comprise a thermal shield configured to shield the electrical flange support apparatus 200, for example from heat generated in melting vessel 14.

Figure 8:
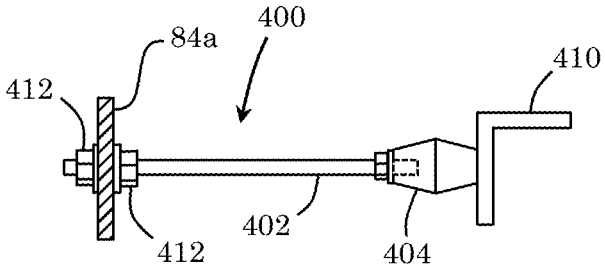
FIG. 8 is a top view of an optional portion of the electrical flange support assemblies of FIGS. 5-7.

In other embodiments, electrical flange support apparatus 200 may comprise an electrode bracing assembly 400 comprising bracing rod 402 and electrically isolating spacer 404 coupled thereto. In various embodiments, bracing rod 402 can be engaged with electrode portion 84a, such as by extending through an opening defined by the electrode portion. For example, a first end 406 of bracing rod 402 can be threaded and extend through the opening and be coupled to electrode portion 84a with suitable fasteners engaged with threaded first end 406. Second end 408 of bracing rod 402 can be coupled to electrically isolating spacer 404, wherein, as shown in FIG. 8, electrically isolating spacer 404 can engage with support member 410, such as building or foundation steel, supporting girders, or any other suitable, stable structure. Accordingly, electrode portion 84a can be maintained at a predetermined separation from the support structure. The predetermined separation can be adjusted by adjusting the effective length of bracing rod 402 that extends through the electrode opening. For example, threaded first end 406 can include multiple nuts engaged therewith, at least one nut 412 positioned on one side of electrode portion 84a, and another nut 412 positioned on the other side of electrode portion 84a, thereby capturing electrode portion 84a between the two nuts.

Figure 9:
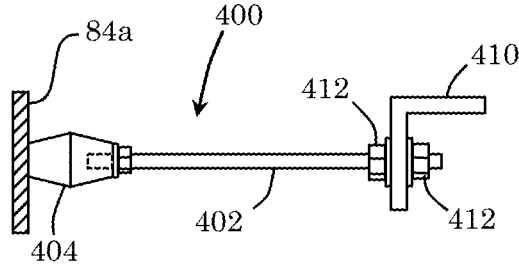
FIG. 9 is a top view of another optional portion of the electrical flange support assemblies of FIGS. 5-7.

In other embodiments, shown in FIG. 9, the arrangement of FIG. 8 can be reversed, wherein first end 406 of bracing rod 402 extends through an aperture in support member 410 and electrically isolating spacer 404 is engaged with electrode portion 84a.

Figure 10:
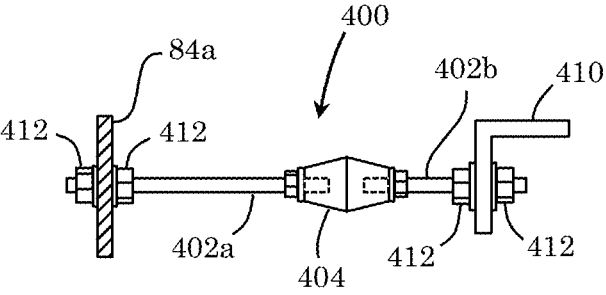
FIG. 10 is a top view of still another optional portion of the electrical flange support assemblies of FIGS. 5-7.

In still other embodiments, shown in FIG. 10, bracing rod 402 may comprise a first portion 402a and a second portion 402b, wherein first portion 402a is engaged with one side of electrically isolating spacer 404 and second portion 402b is engaged with an opposing end of electrically isolating spacer 404, and further wherein first portion 402a does not contact second portion 402b. For example, electrically isolating spacer 404 may include a socket at each side thereof, into which respective ends of first and second portions 402a, 402b can be threaded. Additionally, opposing ends of first portion 402a and second portion 402b can extend through respective apertures in electrode portion 84a and support member 410 and be coupled thereto with nuts 412.

Figure 11:
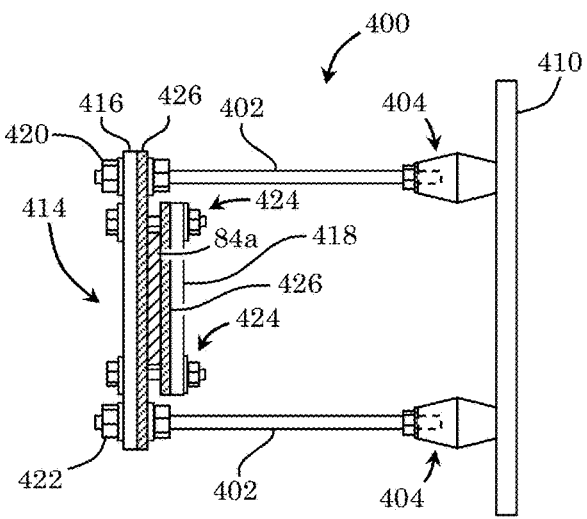
FIG. 11 is a top view of yet another optional portion of the electrical flange support assemblies of FIGS. 5-7.

In some embodiments, as best seen in FIG. 11, electrode bracing assembly 400 may comprise a plurality of bracing rods 402, each bracing rod 402 of the plurality of bracing rods comprising an electrically isolating spacer 404, wherein first ends 406 of bracing rods 402 are coupled to a clamp 414 engaged with electrode portion 84a. Clamp 414 comprises a first clamping plate 416 and a second clamping plate 418, first and second clamping plates arranged on opposite sides of electrode portion 84a. In the embodiment of FIG. 11, each bracing rod 402 is engaged with clamp 414. Specifically, in some embodiments, a first bracing rod 402 extends through a first opening in first clamping plate 416 and is secured thereto, such as with one or more fasteners 420 (e.g., nuts) engaged with threads on the first bracing rod. Similarly, a second bracing rod 402 extends through a second opening in first clamping plate 416 and is secured thereto, such as with one or more fasteners 422 (e.g., nuts) engaged with threads on the second bracing rod. Second clamping plate 418 is secured to first clamping plate with additional fasteners 424 (e.g., nuts and bolts), with electrode portion 84a positioned between the first and second clamping plates. Electrode portion 84a may be electrically isolated from first and second clamping plates 416, 418 by isolating material 426. As in the previous embodiments, electrically isolating spacers 404 are coupled to second ends 408, which in turn are engaged with support member 410.

Heat up of the glass manufacturing apparatus, and arrangement of the electrical flange support apparatus during heat up, can be performed in the following manner in reference to exit pipe 64 and first connecting conduit 32. In a first step, prior to heat up, the angle $\alpha$ of electrode portion 84a relative to a reference plane 436 is measured. Reference plane 436 may be a vertical plane. For example, in some embodiments, angle $\alpha$ may be zero. If reference plane 436 is a vertical plane, a zero angle $\alpha$ means the measured electrode portion is vertical. An angle offset $\delta$ is calculated as angle $\alpha$ minus the angle $\beta$ of electrode portion 84a during heat up, i.e., $\delta = \alpha - \beta$. For example, assuming the reference plane is vertical and the measured electrode portion prior to heating has an angle $\alpha$ of zero relative to the reference plane, and the measured angle $\beta$ of the electrode portion during heating is a non-zero value, angle $\beta$ represents the amount of movement of the electrode portion due to heating. If the electrode portion had a non-zero angle $\alpha$ relative to a vertical reference plane 436 prior to heating, for example 5 degrees, and a non-zero angle $\beta$ relative to the reference plane after heating, for example 10 degrees, the angle offset $\delta$ caused by the heating is 10 degrees–5 degrees=5 degrees. The angle offset $\delta$ can be compared to a predetermined angle offset limit $\theta$. In some embodiments, $\theta$ can be less than 0.25°. Angle offset $\delta$ can be determined multiple times during heat up, for example daily. Measurements of the electrode angles $\alpha$ and $\beta$ can be made with an inclinometer. During heat up, bracing rod 402 can be maintained loose. For example, fasteners 430a and 430b can be used to secure bracing rod to one of clamping plates 416 or 418. During heat up, fastener 430a can be maintained loose and fastener 430b can be turned to adjust a length of bracing rod 402 between support member 410 and the one of clamping plate 416 or 418 and therefore an angle of electrode portion 84a. During such adjustment, angle $\beta$ should be adjusted until angle $\beta$ becomes equal to angle $\alpha$, i.e., $\delta = 0$. Accordingly, it is not necessary that during heating the electrode portion is returned to vertical, but that the angle of the electrode portion relative to the reference plane is returned to its orientation prior to heating. During heat up, fasteners 280 can be maintained loose. If, during heat up, angle $\delta$ is found to be greater than limit $\theta$, fastener 432 coupled to adjustment members 238 and 244 can be adjusted to vary the position of attachment plates 208 and 210, while fastener 434 are maintained loose (not engaged with attachment plates 208, 210). After heating is completed, fastener 432 and 434 can be tightened against attachment plates 208, 210, thereby fixing the position of attachment plates 208, 210 relative to first and second adjustment bases 236, 242. The effect of these procedures can be visualized with the aid of FIGS. 12A-12C.

Figures 12A, 12B, 12C:
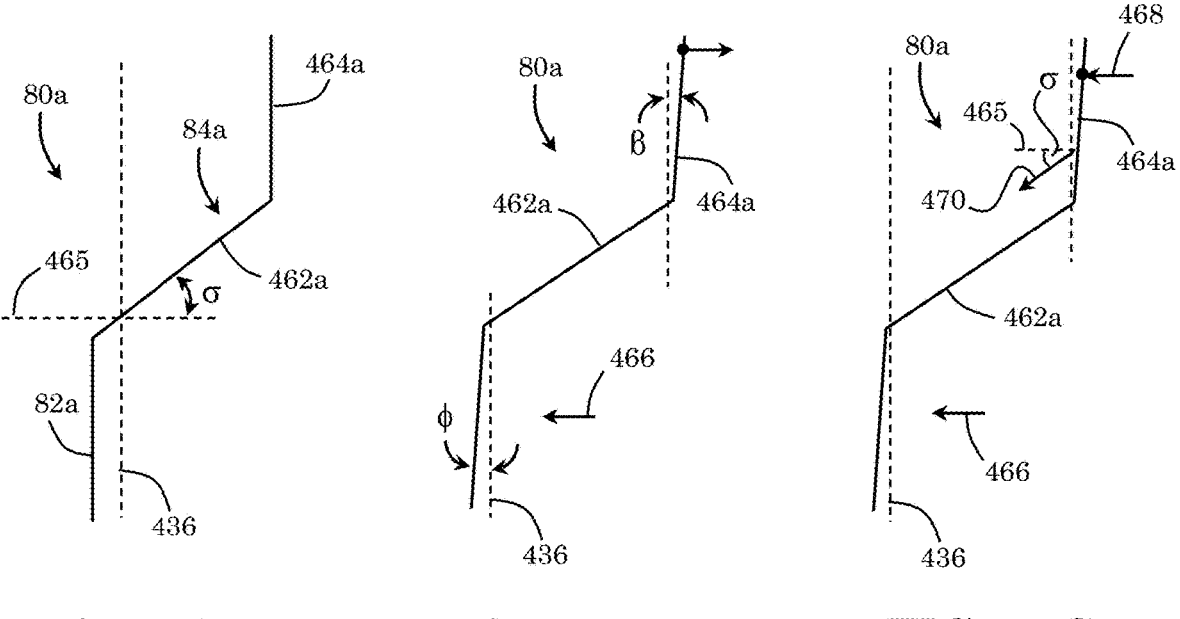
FIGS. 12A-12C depict schematics of an electrical flange during heat up of the associated glass manufacturing apparatus, and the forces exerted thereon.

FIG. 12A illustrates a nominally aligned electrical flange, e.g., electrical flange 80a (shown without accompanying structure, e.g., conduits, etc., for clarity) shown relative to reference plane 436 viewed from the side. In this regard, electrical flange 80a is shown comprising three general parts: the flange body portion 82a as previously identified, and electrode portion 84a which is shown further comprising an angled part 462a and a nominally vertical part 464a. As used herein, nominally vertical part 464a refers to a linear part electrode part that extends away from the respective conduit or vessel to which the associated electrical flange is coupled to within 0 to 20 degrees of vertical, for example, within 10 degrees of vertical, such as within 5 degrees of vertical, and including all angles therebetween. Angled part 462a allows access to the nominally vertical part 464a, including connection point 88a, since electrical flange body portion 82a can be positioned close to melting vessel 14, and can be angled at an angle $\sigma$ relative to horizontal plane 465 in a range from greater than zero to less than 90 degrees. This allows connection point 88a to be spaced farther apart from melting vessel 14 than body portion 82a. Thermal insulation may be placed around the melting vessel that may otherwise make such connection difficult. As shown in FIG. 12B, during heating up of the glass manufacturing apparatus, thermal expansion of metallic vessel assembly 100 causes metallic vessel assembly 100 to lengthen. Arrow 466 indicates a force against electrical flange body portion 82a from the expansion of metallic vessel assembly, including first connecting conduit 32 to which electrical flange body portion 82a is attached. Expansion force 466 moves electrical flange body portion 82a in a direction toward melting vessel 14, thereby reducing gap G1. Simultaneously, resistance provided by the heavy, stiff electrical cables attached at connection point 88a cause electrode portion 84a, including nominally vertical part 464a, to lag movement of body portion 82a. The result, as indicated by angle $\phi$, can be a tilting of electrical flange 80a, and misalignment of first connecting conduit 32 with melting vessel exit tube 64 (e.g., wherein longitudinal axis 120 of first connecting conduit 32 is no longer coaxial with longitudinal axis 116 of exit tube 64). Similarly, nominally vertical part 464a may be offset through angle $\beta$ relative to reference plane 436 (see FIG. 4). Angle $\beta$ may, in some embodiments, be different from angle $\phi$. Accordingly, support bracket assembly 202 and/or electrode bracing assembly 400 can be used to assist movement of electrode portion 84a in concert with electrode body portion 82a. As indicated in FIG. 12C, support bracket assembly 202 can be used to apply a force 470 on nominally vertical part 464a that is at the same angle $\sigma$ relative to horizontal plane 465 as angled part 462a. Electrode bracing assembly 400 can be used to apply a force 468 against nominally vertical part 464a in the direction of local expansion (e.g., toward melting vessel 14). In some embodiments, electrode bracing assembly may be secured (tightened) to maintain a position of nominally vertical part 464a once adjustment of support bracket assembly 202 is completed, while in other embodiments, electrode bracing assembly 400 can be adjusted to move nominally vertical part 464a of electrode portion 84a in the local expansion direction of first connecting conduit 32. Force 468 is typically applied in a horizontal direction, although other force directions may be used. In some embodiments, support bracket assembly 202 may be used alone, or employed in conjunction with bracing assembly 400, while in other embodiments, bracing assembly 400 may be used alone.

While the foregoing description is presented in the context of first connecting conduit 32 and exit tube 64, such apparatus and method can be applied at other conduit end locations, such as between tail portion 70 and second connecting conduit 38. For example, in some embodiments, the electrical flange to which support bracket assembly 202 is coupled may not include an angled portion. Accordingly, support bracket assembly 202 may be configured to apply a force against the respective electrode portion in a direction of the local expansion direction, e.g., in a substantially horizontal direction.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A method of starting a glass manufacturing apparatus, comprising:

positioning a first end of a connecting conduit adjacent a second end of an exit tube extending from a melting vessel such that the first end and the second end are spaced apart by a gap, the first end comprising an electrical flange attached thereto, the electrical flange comprising an electrode portion extending through an enclosure enclosing the connecting conduit;

heating the connecting conduit to an operating temperature, wherein during the heating the connecting conduit expands; and adjusting an electrical flange support apparatus coupled to the electrode portion during the heating, the adjusting comprising:

adjusting at least one of a length of an adjustment member extending between an adjustment base mounted to the enclosure and a support bracket assembly coupled to the electrode portion; or a length of a bracing rod extending between the electrode portion and a support member.

2. The method of claim 1, wherein the adjusting moves the electrode portion in a direction of the expansion of the connecting conduit.

3. The method of claim 1, wherein, prior to the heating, measuring a first angle of the electrode portion relative to a reference plane.

4. The method of claim 3, wherein, during the heating, measuring a second angle of the electrode portion, calculating an offset angle as the difference between the first angle and the second angle, and performing the adjusting to reduce the offset angle.

5. The method of claim 1, wherein a sealing flange is attached to the second end, the method further comprising flowing molten glass through the exit tube and the connecting conduit after the heating, and a portion of the molten glass enters the gap and forms a seal between the sealing flange and the electrical flange.

6. The method of claim 5, wherein the sealing flange comprises a second electrical flange.

7. The method of claim 1, wherein the connecting conduit comprises a first longitudinal axis, the exit tube comprises a second longitudinal axis, and the positioning comprises aligning the first longitudinal axis to the second longitudinal axis such that the first longitudinal axis is coaxial with the second longitudinal axis.

8. The method of claim 1, wherein the electrode portion comprises an angled part and a substantially vertical part, and the adjusting applies a force against the substantially vertical part.

9. The method of claim 1, wherein the connecting conduit is rigidly attached to a fining vessel.

10. The method of claim 1, further comprising supplying a hydrogen-containing gas to the enclosure.

11. The method of claim 1, wherein the support bracket assembly is movable relative to the adjustment base.

* * * * *